US006968973B2

(12) United States Patent
Uyttendaele et al.

(10) Patent No.: US 6,968,973 B2
(45) Date of Patent: Nov. 29, 2005

(54) SYSTEM AND PROCESS FOR VIEWING AND NAVIGATING THROUGH AN INTERACTIVE VIDEO TOUR

(75) Inventors: Matthew T. Uyttendaele, Seattle, WA (US); Sing Bing Kang, Redmond, WA (US); Richard Szeliski, Redmond, WA (US); Antonio Criminisi, Cambourne (GB)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 10/449,700

(22) Filed: May 31, 2003

(65) Prior Publication Data

US 2004/0239699 A1 Dec. 2, 2004

(51) Int. Cl.[7] .............................................. G07F 11/00
(52) U.S. Cl. ......................................... 221/2; 715/855
(58) Field of Search .................... 221/1, 2, 9; 715/855, 715/854, 764; 345/619

(56) References Cited

U.S. PATENT DOCUMENTS

2002/0093541 A1 * 7/2002 Schileru-Key .............. 345/855

OTHER PUBLICATIONS

Chen,S.E., QuickTime VR—an image based approach to virtual environmental navigation, Computer Graphics (SIGGRAPH'95).Aug., 29-38.*
Aliaga, D., J. Cohen, A. Wilson, E. Baker, H. Zhang, C. Erikson, K. Hoff, T. Hudson, W. Stuerzlinger, R. Bastos, M. Whitton, F. Brooks, D. Manocha, MMR: An Interactive Massive Model Rendering System Using Geometric and Image-Based Acceleration, *Proceedings of ACM Symposium on Interactive 3D Graphics (13D)*, pp. 199-206, 1999.

Antone, M., and S. Teller, Scalable extrinsic calibration of omnidirectional image networks, *Int'l J. of Computer Vision*, 49, 2/3 (Mar. 2002), 143-174.
Boult, T. E., Remote reality via omnidirectional imaging, *SIGGRAPH 1998 Technical Sketch*, 253.
Brooks, F. P., Walkthrough a dynamic graphics system for simulating virtual buildings, *Workshop on Interactive 3D Graphics 1986*, 9-21.
Chen, S. E., QuickTime VR—an image based approach to virtual environmental navigation, *Computer Graphics (SIGGRAPH'95)*, Aug., 29-38.
Debevec, P. E., C. J. Taylor and J. Malik, Modeling and rendering architecture from photographs: A hybrid geometry and image based approach, *Computer Graphics (SIGGRAPH'96)*, Aug., 11-20.
Koch, R., M. Pollefeys and L. Van Gool, Realistic surface reconstruction of 3D scenes from uncalibrated image sequences, *J. Visualization and Computer Animation*, vol. 11 (2000), 115-127.

(Continued)

Primary Examiner—Kenneth Noland
(74) *Attorney, Agent, or Firm*—Lyon & Harr, LLP; Richard T. Lyon

(57) ABSTRACT

A system and process for providing an interactive video tour of a tour site to a user is presented. In general, the system and process provides an image-based rendering system that enables users to explore remote real world locations, such as a house or a garden. The present approach is based directly on filming an environment, and then using image-based rendering techniques to replay the tour in an interactive manner. As such, the resulting experience is referred to as Interactive Video Tours. The experience is interactive in that the user can move freely along a path, choose between different directions of motion at branch points in the path, and look around in any direction. The user experience is additionally enhanced with multimedia elements such as overview maps, video textures, and sound.

45 Claims, 6 Drawing Sheets

OTHER PUBLICATIONS

Lippman, A., Movie maps: An application of the optical videodisc to computer graphics, *Computer Graphics (SIGGRAPH'80)*, vol. 14(3), Jul. 1980, 32-43.

Taylor, C. J., Videoplus: A method for capturing the structure and appearance of immersive environments photographs, *European Workshop on 3D Structure from Multiple Images of Large-Scale Environments (SMILE 2000)*, 187-204.

Teller, S. J. and C. H. Séquin, Visibility preprocessing for interactive walkthroughs, *Computer Graphics (Proc. of SIGGRAPH'91)*, vol. 25, 61-69.

* cited by examiner

SYSTEM AND PROCESS FOR VIEWING AND NAVIGATING THROUGH AN INTERACTIVE VIDEO TOUR

BACKGROUND

1. Technical Field

The invention is related to video tours, and more particularly to a system and process for providing an interactive video tour of a tour site using an image-based rendering technique that enables users to explore remote real world locations.

2. Background Art

Interactive scene walkthroughs have long been an important application area of computer graphics, as evidenced by the efficient rendering algorithms that have been developed for visualizing large architectural databases [9,1]. In fact, many beautiful examples of 3D reconstruction from multiple images, video, and/or range data have been demonstrated by research groups around the world. The most ambitious of these is Seth Teller's City Scanning Project at MIT [2], in which dozens of buildings have been reconstructed from high-resolution, high dynamic range omnidirectional panoramas. While these systems allow the viewer to have unrestricted motion throughout the digitized scene, they fail to capture the visual effects such as reflections in windows, specularities, and finely detailed geometry such as foliage, that make the scene look real.

More recently, researchers have developed techniques to construct photorealistic 3D architectural models from the real world [5,6] and also produced real world tours based on panoramic images [4] and video [3,8]. One such proposed interactive video tour system is described in Lippman's seminal Movie Maps project [7] which collected video clips of driving through the streets of Aspen, and allowed the viewer to navigate through these clips, which were stored on an optical videodisc. Even more recently, many people have demonstrated interactive video walkthroughs using various kinds of omni-directional cameras. For example, interactive video tours based on catadioptric and multi-camera sensors have also been demonstrated [3,8].

What all of these systems have in common is a desire to create a real sense of being there, i.e., a sense of virtual presence that lets users experience a space or environment in an exploratory, interactive manner. This coincides with people's long held interest in travel, in being able to experience interesting and beautiful remote places and to document them with paintings, photographs, and video. However, to date none have been able to provide a viewer with continuous control over both position and viewpoint, as would be desirable to achieve the goal of creating a sense of being there. For example, viewers of Movie Maps had to branch between a fixed number of video clips. In addition, these systems cannot achieve a fully interactive, photorealistic, video based tour on a personal computer at or above broadcast video resolutions and frame rates. The present interactive video tour system overcomes these shortcomings as will now be described.

It is noted that in the preceding paragraphs, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2,3]. A listing of references including the publications corresponding to each designator can be found at the end of the Detailed Description section.

SUMMARY

The present invention is directed toward a system and process for providing an interactive video tour of a tour site to a user. In general, the present system and process provides an image-based rendering system that enables users to explore remote real world locations, such as a house or a garden. While many previous systems have been based on still photography and/or 3D scene modeling, the present approach is based directly on filming an environment, and then using image-based rendering techniques (rather than 3D reconstruction, which may be brittle) to replay the tour in an interactive manner. As such, the resulting experience is referred to as Interactive Video Tours. The experience is interactive in that the user can move freely along a path, choose between different paths at branch points, and look around in any direction. The user experience is additionally enhanced with multimedia elements such as overview maps, video textures, and sound. The combination of high resolution continuous imagery combined with interactivity provides viewers with an unprecedented sense of presence.

To accomplish the foregoing, the present interactive video tour system first inputs video data that includes a sequence of video frames, each of which represents a panoramic view of the tour site from a particular location along a path through the site. In addition, scene data is input. This scene data includes information used to identify the frame associated with each specifiable location along the aforementioned path, as well as information that given a user-specified viewing direction and direction of motion along the tour path can be used to determine which video frame and what part of that video frame is needed to render and display the next image of the video tour. Interactive control of the system is accomplished via a user interface that includes a viewing and navigation window having a plurality of sectors for viewing and controlling the video tour, and which implements user commands that are entered by a user directly via a selection device (e.g., a gamepad) and via the user selecting displayed items within the viewing and navigation window. These commands include, among other things, the aforementioned user-specified viewing direction and direction of motion. More particularly, the user selection device allows the user to pan the viewing direction left/right/up/down and select the direction of motion to move the user's viewing position forwards and backwards along the tour path. As a result, the user is given continuous control over the viewing position along a path through the tour site, as well as the viewing direction at various points on the path.

The input data and user interface are used as follows to present the video tour. First, for a given viewing position within the site along the path, the frame associated with that position is identified using the scene data and designated as the current frame. The given viewing position can come from a variety of sources. For example, it can be a prescribed initial position utilized when the tour is begun. It can also be directly selected by the user as will be described later in connection with the map feature of the interface. In addition to designating the current frame, the current user-specified viewing direction and direction of motion along the tour path (if one) is also input. It is noted that the latter input may not exist as the user may want to stop at a point along the path and view the surrounding scene.

The video data associated with that portion of the current frame which corresponds to a prescribed field of view around the current viewing direction is then obtained and rendered. The resulting image of the tour site from the current path location is then displayed to the user. At the same time, the frame needed to display the next image of the video tour is identified using the scene data based on the user-specified direction of motion along the tour path. This newly identified frame is designated as the current frame in lieu of the previously identified frame. The process then repeats itself from the point where the current user-specified viewing direction and direction of motion are input, for as long as the user wants to view the video tour.

In regard to the foregoing action of identifying the frame needed to display the next image of the video tour, this is done in different ways depending on the circumstances. For example, if the user has not entered a direction of motion, thereby indicating he or she wishes to continue viewing the tour site from the same location on the path, the previously designated frame remains the current frame. If the user has entered a direction of motion command, then how the next frame is chosen will depend on if the user is located at a branch point on the path. Essentially, the path through the tour site has at least one branch point (and preferably many) from each of which the path either turns an abrupt corner or diverges in more than one direction such that the user can follow any part of the path extending away from the branch. The scene data includes a branch points table which for each video frame associated with a branch point, identifies the next video frame that is to be played in view of the current viewing direction. Thus, to determine what the next frame is when a direction of motion has been entered, it is first determined from the scene data whether the current frame is associated with a branch point or not. If it is not, the next sequential frame of the video data in its original capture order is designated as the newly identified frame if the user has specified a forward direction (as related to the forward direction when the video frames were captured), and the previous sequential frame is designated as the newly identified frame if the user has specified a backward direction.

It is noted that in one embodiment of the present interactive video tour system and process, when the viewing direction specified by the user is outside a prescribed range, the motion command is ignored. More particularly, it is determined whether the current viewing direction is outside a prescribed forward and backward range. If it is outside the forward range, any forward direction of motion specified by the user is ignored. Similarly, if it is outside the backward range, any backward direction of motion specified by the user is ignored. Thus, rather than identifying the next or previous sequential frame of the video data as the newly identified frame, the previously identified frame remains the current frame such that the user continues to view the tour site from the same location.

If it is determined from the scene data that the current frame is associated with a branch point, a different procedure is employed to identify the new frame. More particularly, the frame specified in the scene data as the next frame for the current frame and viewing direction is designated as the new frame.

The video data may be compressed to facilitate its storage and transmission. If it is, it needs to be decompressed before being processed as described above. The video data is compressed using a compression method which allows the efficient decompression of any frame, not just the next sequential frame. In addition the compression scheme allows any portion of a frame to be decompressed without having to decompress the rest of the frame. In this way only the portion of the frame that is being rendered to produce the current tour image needs to be decompressed, thereby reducing the processing needed and the time required to display the next image to the user.

The scene data also includes a frame rotation table that among other things provides the global orientation direction for each video frame. This global orientation corresponds to a direction designated when the frame was captured as a zero degree line from which the viewing direction is measured. Thus, when the current viewing direction is used to identify the portion of the current frame that is to be rendered, the direction is measured from this global orientation direction. Another use for the global orientation involves situations where there is a substantial divergence in the global orientation direction between a frame associated with a branch point and the frame designated as the next frame. This could occur if the next frame was not the next frame captured when the tour was filmed, but one captured when the path crossed itself. To compensate for this divergence, prior to obtaining the portion of the current frame which corresponds to the prescribed field of view around the current viewing direction, the relative rotation between the frames is estimated using the global orientation information for those frames. Any mismatch is corrected and then the video data retrieved based on the corrected viewing direction. Further it is noted that when transitioning from a branch point to a part of the path extending away from it, there are two options on how to handle the current user-specified viewing direction. In one mode (i.e., the relative mode), the specified viewing direction is honored and the portion of the frame rendered will be that associated with the specified viewing direction. Thus, if the user was looking to the left of the path at the branch point, he or she will be viewing the scene to the left of the new part of the path. However, an absolute mode can also be employed. In this mode, the current viewing direction is reset to one approximately coincident with the direction of the part of the tour path being taken by the user, prior to obtaining the portion of the current frame as described above. Thus, for example, if the user were viewing the scene to the left of the path at the branch point before turning into a part of the path going through a hallway, the user's point of view would shift to look down the hallway, rather than at the wall on the left side of hallway.

It is noted that the frame rotation table may also include a jitter correction factor for each frame. This factor is included when the method employed to capture the video frames introduced jitter. For example, jitter can be introduced if the tour is filmed by a cameraman walking through the tour site. If a jitter correction factor is provided for the current frame, it is used to remove the jitter error from the frame before any rendering is attempted.

The aforementioned user interface also includes features other than just inputting a viewing direction and direction of motion. For example, the viewing and navigation window can include a navigation sector that indicates the name and direction to regions of the tour site which are adjacent to the region currently being viewed by the user.

In addition, the viewing and navigation window can include a map sector that displays a map graphic of the tour site. This map graphic can include a line representing the tour path on the map graphic, as well as an indicator (e.g., an arrow) that identifies the point on the tour path from which the user is currently viewing the tour site. These items are obtained for display in the viewing and navigation window from the scene data. For example, a map region table in the scene data provides the particular map graphic that is to be displayed for each of a prescribed set of frame ranges. This allows the map to be customized for each region such as highlighting the region the user is currently viewing. A path table can be included to identify the location on the map graphic representing the point on the tour path that each frame (including the current one) was captured, thereby facilitating the placement of the indicator on the map graphic. The indicator can also be configured to point in the user-specified direction of motion along the path. Still further, as indicated previously, the user can select a point on the tour path line of the map graphic and as a result the next frame processed corresponds to the user-selected path point. Thus, the user can jump to another part of the tour site without having to follow the path.

The viewing and navigation window can also include an information sector that displays icons representing objects of interest which are visible in the portion of the frame currently being displayed to the user. When a user selects one of these icons, additional information about the associated object is displayed in a separate window on the display. The information as to what icon to display and when, as well as how to link to the information about the object associated with an icon, is obtained from an object information table included in the scene data. Essentially, this table identifies the icon and its link information to be used when the current frame and viewing direction fall within a prescribed set of frame ranges and viewing directions in which the associated object appears.

Another interactive feature that can optionally be incorporated into the present system involves replaceable objects. A replaceable object is an object that is seen at some location in the tour site, and which can be changed based on user input. For example, a replaceable object could be a picture on the wall or a television set. The object is highlighted in some way so as to indicate its nature to the user. The user can then select the object in the displayed tour image to change its appearance. In one version of the present system, a menu appears in the window when the replaceable object is selected. This menu contains a list of replacement objects that can be inserted into the region associated with the replaceable object. A replacement object could be a graphic, image, video, video-texture, or other displayable item. When the user selects from the list, the object corresponding to that choice is inserted. The information needed to identify what menu is to be displayed and the link details to the replacement objects included in the menu list is obtained from an object replacement table of the scene data. Essentially, for a prescribed set of frame ranges and viewing directions associated with the frames in which the replaceable object appears, the table identifies the appropriate menu and link information needed to access each replacement object so that it can be inserted into the current tour image during rendering. In another version of the present system, instead of a menu appearing when the user selects the replaceable object, the object simply changes. Each time the user selects the object, another one replaces it until all the available objects are exhausted at which time the objects are inserted over again cyclically. In this case the object replacement table just provides the aforementioned link information.

The present interactive video tour system and process can also support a spatialized sound feature by inputting audio data that represents sound associated with the tour site. More particularly, multiple audio tracks captured at different known locations within the tour site are input. During the time that the user views the tour site from a viewing location, each track is attenuated based on the inverse square distance rule in view of that location. The attenuated tracks are mixed together and then played for as long as the user remains at the location.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
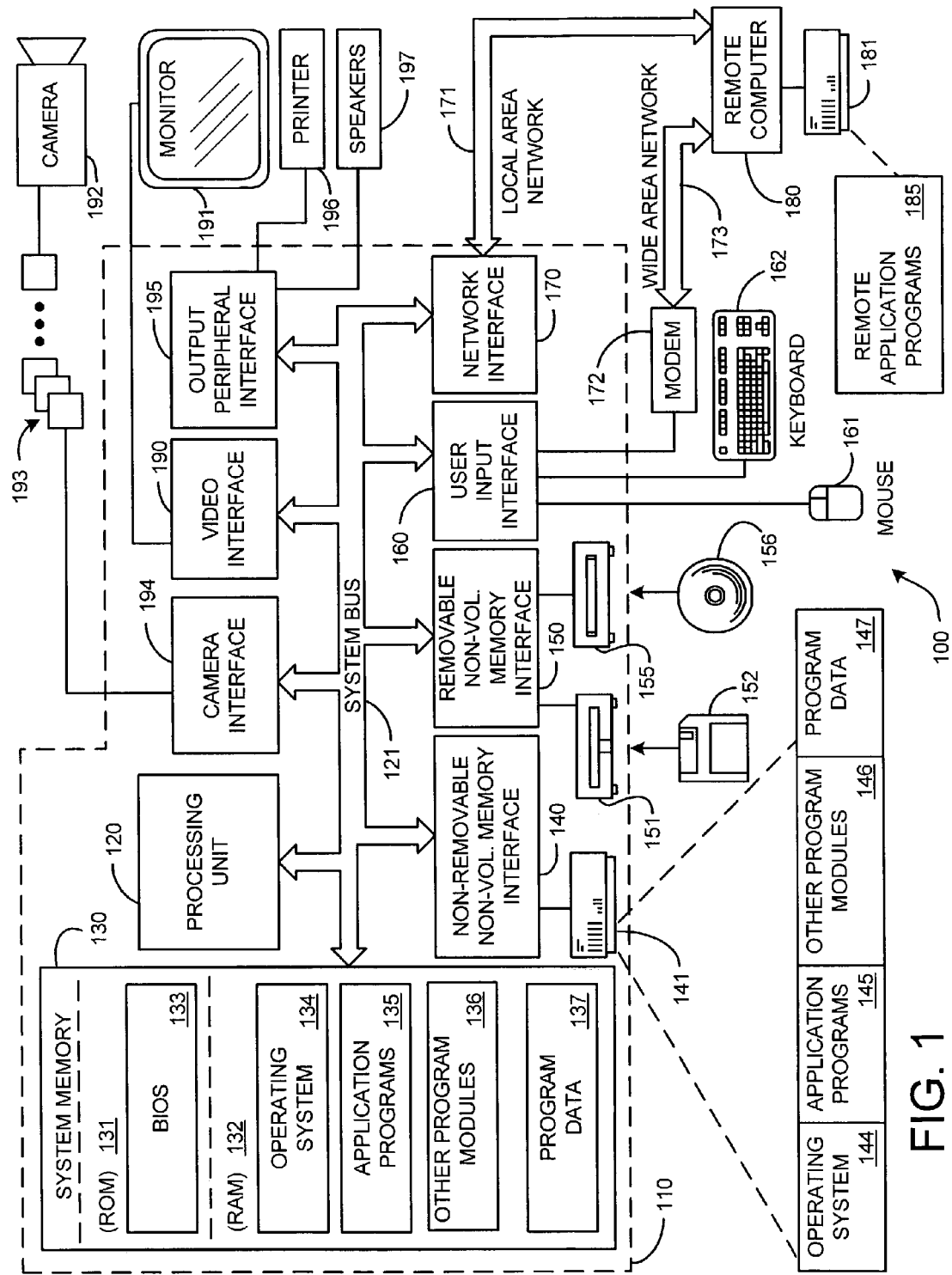
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Interactive Video Tour System and Process

Figure 2:
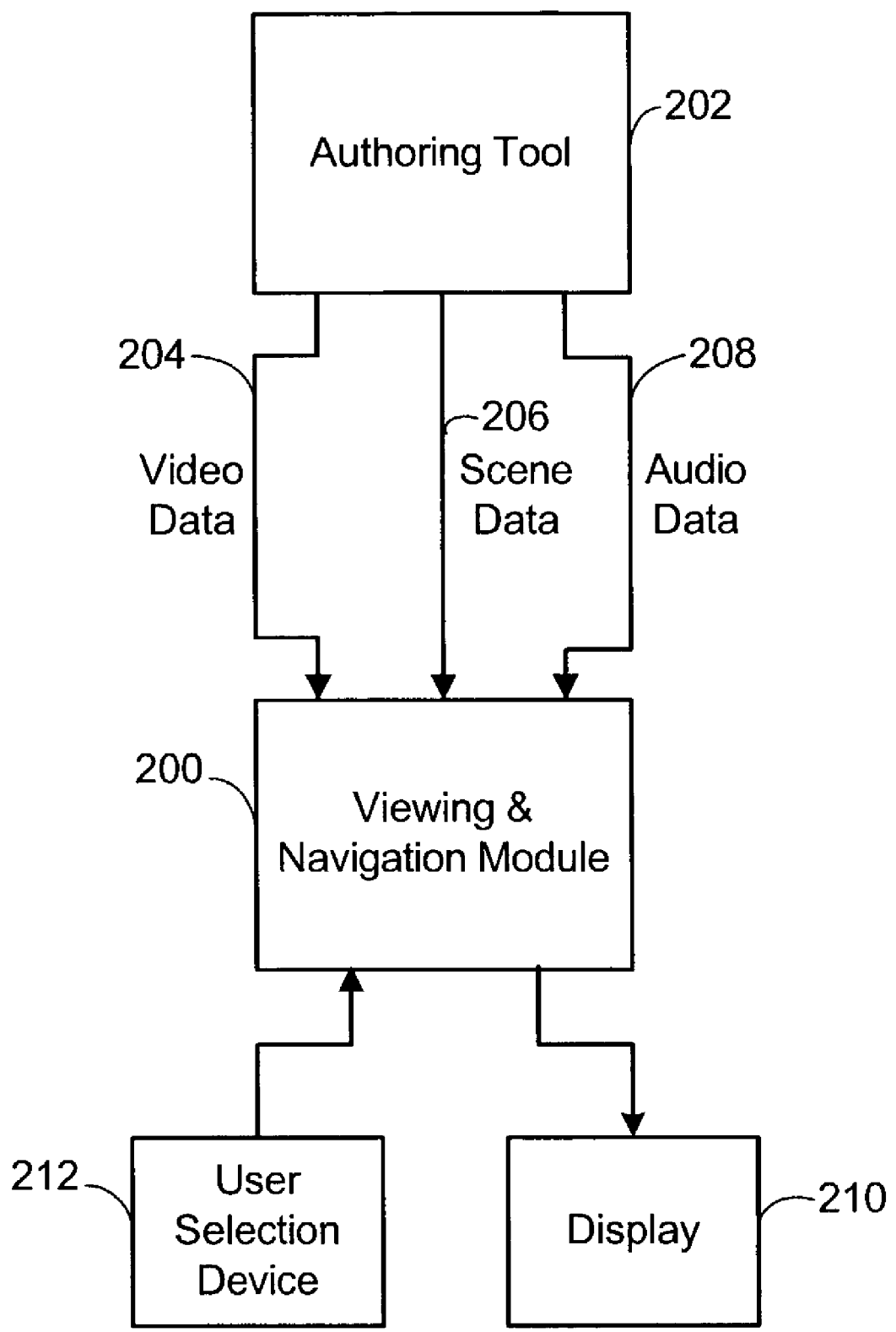
FIG. 2 is a block diagram illustrating the overall interactive video tour scheme and the part the viewing and navigation module according to the present invention plays in it.

The exemplary operating environment having now been discussed, the remaining part of this description section will be devoted to a description of the program modules embodying the invention. Generally, the system and process according to the present invention involves providing an interactive video tour of a tour site to a user. Specifically, the present invention is directed toward a viewing and navigation module that is used to implement the video tour. Referring to FIG. 2, the viewing and navigation module 200 according to the present invention is shown in context of the overall interactive video tour scheme. Essentially, an authoring tool 202 generates a specialized file 204 representing a video of the tour location and another file 206 containing scene data associated with the tour. In addition, a separate audio file 208 can be generated, as will be described later. The video, scene data, and audio files 204, 206, 208 are input into the viewing and navigation module 200, where the tour environment and all associated user interface elements are displayed to a user on display 210. The user can then interact with the viewing and navigation module 200 via a user selection device 208 of some type (such as a conventional gamepad as was the case in tested embodiments of the present invention). The specialized video file will be described in the next section, followed by a description of the scene data and audio files, and then the viewing and navigation module.

2.1 The Video File

The specialized video file described above should have certain attributes to ensure the capabilities of the present interactive video tour viewing and navigation system can be fully realized. In general, the video file should provide data representing a sequence of frames, each of which represents a panoramic view of the tour location (such as a house or garden) as could be seen by a person or vehicle moving through the location. The path through the tour location should also have a number of places where it crosses previous portions of the path. These will represent branches as will be described later.

In addition, the following attributes would provide an enhanced tour experience even if they are not necessarily required. As the lighting conditions may vary drastically as one moves through the tour location, it is desirable that the frames be high dynamic range images. Further, if the panoramic view of a point in the tour location is created by combining separate, smaller field-of-view images of the surrounding scene at that point (as was the case in the tested versions of the present system and process), it is desirable that a stitching procedure be employed that removes parallax in areas of image overlap.

Still further, the image data contained in the specialized video file image data must be accessed and rendered quite rapidly to provide a true interactive experience to the user. For this reason, a video compression scheme that minimizes bandwidth while allowing for rapid and selective run-time decompression is employed. There are two important requirements for such a scheme. First, it must allow for temporal random access, i.e., it must be possible to play the content forward, backward, and jump to arbitrary frames with minimal delay. And second, it must support spatial random access so that sub-regions of each panoramic frame can be decompressed independently. In this way, only that portion of the frame needed to render the portion of the surrounding scene that the user is interested needs to be processed. Any video compression scheme that provides the foregoing attributes can be used to encode the specialized video file. For example, a video compression scheme appropriate for the task is disclosed in a co-pending U.S. Patent Application entitled "A System And Method For Selective Decoding And Decompression", which was filed on Jul. 7, 2000 and assigned Ser. No. 09/611,649. A commensurate decompression module would then be included in the present interactive video tour viewing and navigation system to decompress the temporal and spatial portions of the video needed to render the desired user-specified view.

2.2 The Scene Data File

Figure 3:
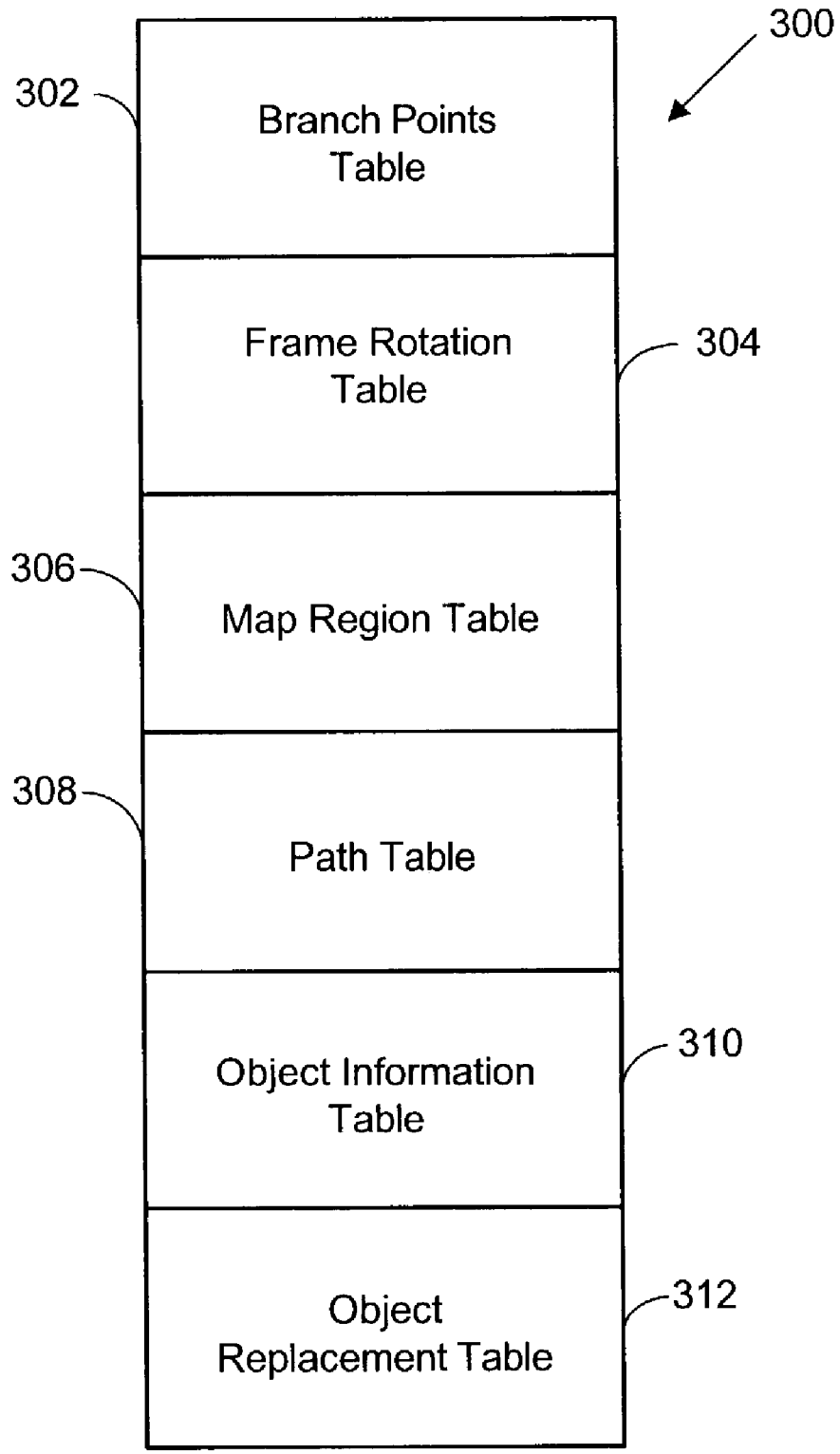
FIG. 3 is a diagram representing a full scale version of the scene data file according to the present invention.

Like the specialized video file, the scene data file described above should contain certain information that can be used to ensure the capabilities of the present interactive video tour viewing and navigation system are fully realized. The file itself can take any convention form, such as the XML file as was used in tested embodiments of the present system and process. In general, the information included in the scene data file allows the module to render and display the tour, generate site maps, and manipulate objects seen during the tour. More particularly, as shown in FIG. 3, the file 300 can have a series of data tables including a branch points table 302, a frame rotation table 304, a map region table 306, a path table 308, an object information table 310, and an object replacement table 312. The scene data file 300 illustrated in FIG. 3 represents a full scale embodiment including data to implement all the features that will be described shortly. However, if a feature associated with one of these tables is not implemented, then the table can be eliminated from the file. Each of these tables and the features they support will now be described in the sections that follow.

2.2.1 Branch Points Table

As described previously, the tour path represented in the video file could contain a number of points where it crosses itself. These represent branch points that give a user the option to follow any branch of the path extending away from the branch point. This will be described in more detail later, but in the context of the scene data file, certain information is needed to implement the feature. To this end, the branch point table essentially identifies the frame of the video file associated with a branch point, and what frame is to be accessed and "played" next given the current viewing direction specified by the user. As will be described later, the user has the ability to view any portion of the surrounding scene from a point along the tour path, within a prescribed field of view of a user-specified viewing direction. The viewing direction refers to the direction the user has chosen to view the scene at the current point on the tour path. In the tested version of the present system and process, the viewing direction is measured in degrees around a point in the tour path with zero degrees being the direction of the global orientation of the frame as will be discussed shortly. In essence, the user instructs the viewing and navigation module (via the aforementioned input device) what direction he or she wishes to view the surrounding scene at a point along the path, and the module responds by rendering that portion of the frame associated with that point from the video file and displaying it to the user.

At points along the path where no branch exists, there are only one or two choices of the frame to be played next. In the case where the path point is along a straight portion of the path, either the frame preceding the current frame, or the frame following the current frame, would be played next. The decision as to which frame is to be played is answered using the current user-specified direction of motion. For example, the frame following the current frame in the original video of the tour site would be played if a forward direction (in relation to the forward direction of the original video) is specified, and the previous frame would be played if a backward direction is specified. This same reasoning would apply to a point at a dead end in the path, except that only one choice exist—namely to play the preceding frame. There is, however, a caveat to the foregoing frame choosing procedure that can be implemented. Essentially, if the user-specified viewing direction is too far to the side of the current path, it becomes ambiguous as to whether the user wants to move forward or backward in accordance with the currently specified direction of motion. Therefore, a viewing direction buffer zone could be established where the user does not move at all through the tour site, regardless of the currently specified motion direction. For example, if the user specifies a viewing direction that falls within 90 to 110 degrees from the current path direction on either side of the path, motion could stop (i.e., the next frame is not played).

The branch points table is not needed to make this foregoing "next frame" decision as there are always the same choices. However, at a branch point where the original path crosses and where the user has more than just one or two directions, he or she can proceed through the tour site. This is where the branch point table comes into play.

The branch points table lists for every branch point along the tour path, the next frame that is to be played depending on a prescribed range of viewing directions. For example, take the case of a branch point representing where the original tour path crossed a previous portion of the path and continues on. Thus, the path would look like a four-way intersection at such a branch point. This would give the user four options. The user could continue along the path he or she is currently following, reverse directions and go back the way he or she came, turn onto the portion of the tour path extending to the right of the current path direction, or turn onto the portion of the tour path extending to the left of the current path direction. The decision as to what frame is accessed and played next in order to make it appear to the user he or she is following one of the aforementioned path options, is made based on the branch points table and the current user-specified viewing direction. Essentially, for a particular branch point, the branch points table would list a different frame to be played next depending on which range the current user-specified viewing direction fell into. For example, in the four-way intersection example, assume the original path crossed perpendicularly at the branch point under consideration. Given this, the next frame specified in the table could be the frame that followed the current frame in the originally captured video if the user-specified direction is within +/−45 degrees of the original path direction of the part of the path the user is currently traversing, and the next frame specified in the table could be the frame that preceded the current frame in the originally captured video if the user-specified direction is within a range of +135 to −135 degrees of the original path direction of the part of the path the user is currently traversing. These two options represent proceeding ahead on the same part of the path or reversing directions and following the path back. Similarly, the next frame specified in the table could be the frame that was captured in the original video at a point in the tour path just to the left of the current path direction if the user-specified direction is within a range of −45 to −135 degrees of the original path direction of the part of the path the user is currently traversing. Alternatively, the next frame specified in the table could be the frame that was captured in the original video at a point in the tour path just to the right of the current path direction if the user-specified direction is within a range of +45 to +135 degrees of the original path direction of the part of the path the user is currently traversing.

It is noted that the foregoing orientation ranges are examples only. Other ranges could be employed as desired. For example, a wider range might be assigned to a frame associated with a part of the path leading away from the branch point that it is believed a user is more likely to want to follow. Likewise, in a case where the tour path does not cross perpendicularly, the foregoing ranges could be decreased or increased in a manner that would "send" the user along the part of the path that would seem natural given the user-specified viewing direction at the branch point. The same range adjustment policy could also apply to branch points where the tour path does not cross like a four-way intersection, but instead resembles a T-shaped intersection, a Y-shaped intersection, a 1-way corner, or even an intersection with more than 4 branches. It is noted that in the case of a T-shaped or Y-shaped intersection, only three paths lead away from the branch point, and so only three ranges would be specified. Similarly, only one range is needed for a corner and if there are more than 4 branches each would have a specified range associated with it.

2.2.2 Frame Rotation Table

The frame rotation table serves a couple of purposes. First, for each frame of the video file, the frame rotation table lists the global orientation associated with that frame. This global orientation refers to the direction that the "zero degree line" was pointed when the frame was captured. For example, if each panoramic frame is constructed from images captured using multiple cameras (as it was in tested versions of the present invention), the zero degree line would be the optical axis of the camera that was generally facing forward along the direction of travel during the time the video data associated with the tour was generated. This information is used by the viewing and navigation module to establish what part of the frame data needs to be rendered and displayed to show the portion of the scene the user specified he or she wants to view.

The table also optionally lists a jitter correction vector for every frame. This information is useful when the method by which the video data was captured results in jitter between frames. For example, if the video was captured by a person carrying a camera rig through the site along the tour path, then there is likely to be jitter. The jitter correction factor would be pre-computed and provides a way to create a smooth-looking trajectory through the scene even if it was not captured that way. Essentially, the correction factor for a frame would be employed by the viewing and navigation module to correct the global orientation for the frame prior to rendering the desired portion for display to the user.

2.2.3 Map Region Table and Path Table

As will be described later in connection with the viewing and navigation module description, a graphical user interface (GUI) is generated which is shown to the user on the aforementioned monitor. Optionally included in the interface is an interactive map graphic that in essence shows an overhead layout of the tour site. The map graphic can also include a line indicating the tour path.

In order to implement the map feature, the viewing and navigation module needs certain data, which is provided by a map region table and a path table. The map region table is a list of regions and their associated frame ranges. Each frame range corresponds to the frames of the video captured within a predefined region of the tour site. For example, if the tour site was a house, the predefined regions might be the rooms of the house. Thus, each frame range in the list would correspond to the frames of the video captured in the room of the house associated with the range. For each separate frame range, the table identifies what map graphic should be displayed in the aforementioned interface. Having different map graphics for each predefined region facilitates features such as having the current region highlighted in the map graphic and including indictors (such as an icon) representing points of interest within the current region of the tour site. The map region table can also include a region name for each frame range. This information can be employed to provide another feature to the interface-namely a location label that tells the user what region he or she is currently viewing. For example, assume once again that the tour site is a house. In this case the region labels could identify the current room, such as the living room or dining room. The region label associated with the current user location can be displayed with the map to further aid the user in navigating through and viewing the tour site. The region labels can also be used for other purposes, such as to indicate the direction along the path that a user should follow to get to another part of the site. This feature will be described in more detail later.

The path table identifies for each frame of the video file a position on the map that corresponds to the spot in the tour site that the frame was captured. This information can be used to superimpose a location indicator on the map graphic showing the user's current location in the tour site. This indicator can also be configured to indicate the user's current direction along the tour path. For example, the indicator could be arrow-shaped with the tip of the arrow pointing in the user's current direction of movement through the tour site. Another feature that can be included in the interface would allow a user to select a point on the tour path shown on the map graphic. In response, the tour display would jump to the viewing location associated with that point, as will be described in more detail later. The viewing and navigation module knows what part of the video to jump to from the path table. This is generally accomplished by identifying the frame associated with the location selected by the user on the map graphic from the path table.

2.2.4 Object Information Table

Another feature of the present interactive video tour system and process that can optionally be provided by the viewing and navigation module is the display of icons representing objects seen in the portion of the frame being displayed to the user. These icons can appear anywhere appropriate in the aforementioned GUI, such as on the map graphic at the location where the object represented resides. Alternately, the icons can be displayed elsewhere in the interface, such as on an information bar. The user would have the ability to select a displayed icon which would then open up a window that provides information about the object associated with the selected icon, or could even open up a link to some type of multimedia presentation about the object.

In order for the viewing and navigation module to know what icon to display and what link or file to access when the user selects the icon whenever a particular part of a frame is being displayed, certain information is needed. This data is provided by an object information table that can be part of the scene data file. Essentially, for every sequence of frames (which is listed in the table as a frame range) that depict a pre-established object of interest, a range of viewing directions is associated therewith. When the portion of the frame corresponding to the frame range and associated viewing direction range is rendered, the object of interest would appear in the displayed scene. In addition, for each of the aforementioned frame ranges, information concerning the icon or icons that are to be displayed when a viewing direction associated with that range is specified by the user, is included in the table along with link information. This allows the information associated with the object to be accessed when the user selects the icon. In this way, whenever the current frame falls within one of the listed ranges and the user-specified viewing direction matches a listed viewing direction for that range, the specified icon or icons can be displayed by the viewing and navigation module.

2.2.5 Object Replacement Table

Yet another feature of the present system and process that can optionally be provided by the viewing and navigation module is the display of a user selectable menu or list in the aforementioned GUI whenever the user is viewing a particular object in the tour scene. This list would represent such things as replacement graphics, images, video or video-textures that can be superimposed onto an object while the user is viewing it. For example, assume the object of interest is a picture on the wall. In this case if the current user-specified viewing direction would result in the picture being visible within the displayed portion of the current frame, then the list provided could be a selection of graphics or images that could be superimposed on the location of the picture in the displayed portion of the frame. In other words, the user can choose what artwork he or she would like to see hanging on the wall in the displayed scene. A similar replacement scenario could involve a television set. In this case, the provided list would represent different videos or even live broadcasts that could be played and superimposed on the screen to the television while the user is viewing the portion the scene containing the television.

In order for the viewing and navigation module to implement the foregoing replacement feature in the situations described above, or similar replacement scenarios, it must be known what list to display and when. It is also necessary to identify the replacement region on a frame-by-frame basis. This information can be provided to the module using an object replacement table. In this case, the frame range and viewing direction would correspond to when the object that is to be replaced is visible in the displayed portion of the current frame. For each frame range and viewing direction range combination listed in the table, information on how to access the data needed to display the appropriate menu would be included in the table, as is link information needed to access the replacement objects listed on the menu and location information identifying where in each frame of the range that the replacement region can be found. In this way, whenever the current frame falls within one of the listed ranges and the user-specified viewing direction matches the listed range, the specified menu can be displayed by the viewing and navigation module. Alternately, the replaceable object could be highlighted in the displayed tour image, and upon selection by the user, the aforementioned menu would be made to appear.

In another alternate version of the replacement feature, a menu is not displayed. Rather, when the user is viewing an object that has been set up for the replacement feature, the object is highlighted and the user has the ability to change what is displayed in the object by inputting a change command using the aforementioned input device. In this version of the replacement feature, each time the user inputs the change command a different graphic, image, video, or the like, is superimposed on the object. This process is cyclic in that once all the available choices associated with the object have been displayed in response to multiple user change commands, the choices repeated from the beginning. The object replacement table used by the viewing and navigation module is the same as described above with the exception that instead of identifying a menu list, it identifies the object replacements that are to be cycled through.

2.3 The Audio File

In addition to the panoramic image frames, the video file can contain one or more audio data tracks. Or, alternately, the audio data can be provided in one or more separate files (as shown in FIG. 2). The audio data could represent a single track that is recorded with a microphone or array or microphones that are attached to or placed near the camera as it is moved through the tour site to capture the video data.

However, the tour is made richer by adding spatialized sound. In this approach, audio data is acquired in situ at different pre-established locations within the tour site. These locations can be chosen for effect. For example, they might be made adjacent sources of interesting sounds within the site, such as waterfalls, swaying trees, fountains, or pianos. It is also noted that the audio tracks do not need to be recorded simultaneously with filming the site for the tour.

The location in the tour site where each audio track is recorded in the spatialized sound approach is identified and associated with the track. At viewing time, the viewing and navigation module to be described shortly attenuates each track based on the inverse square distance rule in view of the user's current viewing location in the tour site. The attenuated tracks are then mixed together by the audio card of the computing device hosting the viewing and navigation module and played for as long as the user remains at that location. This simple technique increases the realism of the whole experience by conveying the feeling of moving closer or farther away from sources of sound within the tour site.

2.4 The Viewing and Navigation Module

The primary function of the viewing and navigation module is to display the tour environment and all associated user interface elements, and to act on commands entered by a user via an input device. Any appropriate type of input device could be employed to input user commands (e.g., mouse, trackball, and the like), however in tested versions of the present system and process, a standard gamepad was employed. For convenience, the following description of the viewing and navigation module will assume a gamepad is being employed by the user. However, as stated above, any appropriate input device can be used, and so it is not intended that the present invention be limited to just the use of a gamepad.

The gamepad controls are mapped in a similar way to driving games, allowing the user to pan left/right/up/down and move forwards and backwards along the tour path. The forward/backward buttons are swapped as the user rotates 180° from the forward direction of the originally captured video tour. This causes the user to follow the original path backwards, however, it appears to be a valid forward direction to the user who is simply viewing the portion of each frame opposite the original forward direction in reverse capture order. In order to prevent objects moving through the scene during the tour capture phase from appearing to be going backwards when the user follows the original path in the reverse direction, it could be that only static environments are filmed, or the unwanted moving object could be edited out of the tour video using conventional methods.

In general, as the user navigates the tour environment, the viewing and navigation module computes the minimum set of data to request from the aforementioned selective decompressor sub-module. Conventional rendering methods are then employed to create an image of the tour environment that is displayed using the 3D graphics hardware of the computing device hosting the module. This image represents a portion of the current frame in the user-specified viewing direction that is within a prescribed field of view. The viewing and navigation module also determines the next frame that will be played as described previously and requests the needed set of data from the decompressor in parallel with rendering the current frame. If a branch point is associated with the current frame location, the branch point table of the scene data file is used to identify the next frame.

Figure 4:
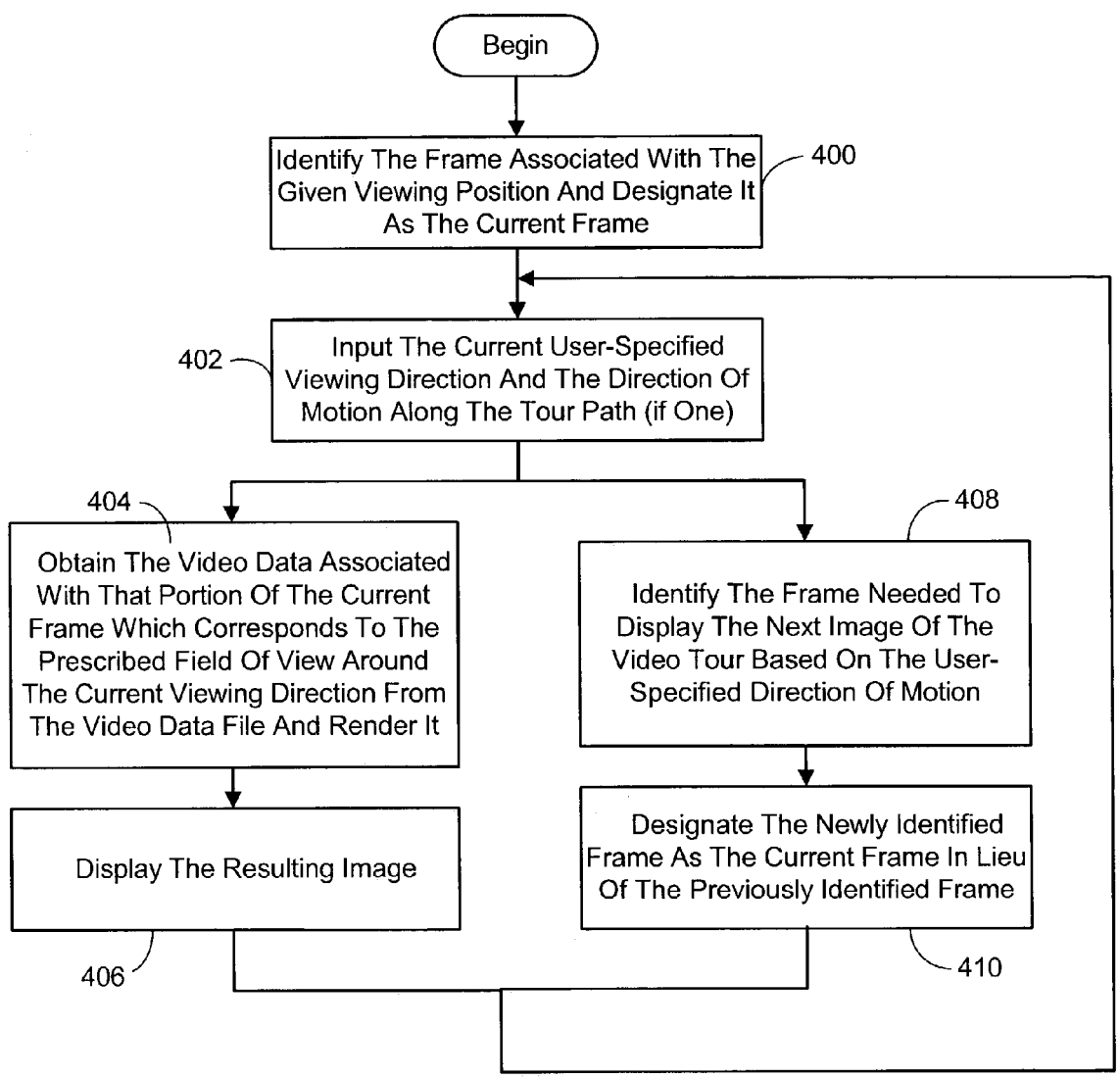
FIG. 4 is a flow chart diagramming a process for generating the sequence of rendered images that represents the part of the interactive video tour process according to the present invention concerned with displaying images of the tour scene.

More particularly, this procedure is accomplished as follows. Referring to FIG. 4, for a given viewing position along the tour path, the frame associated with that position is identified using the scene data and designated as the current frame (process action 400). The current user-specified viewing direction and direction of motion along the tour path (if one) is also input (process action 402). It is noted that the latter input may not exist as the user may want to stop at a point along the path and view the surrounding scene. The video data associated with that portion of the current frame which corresponds to the prescribed field of view around the current viewing direction is then obtained from the video data file and rendered (process action 404). The resulting image of the tour site from the current path location is then displayed to the user (process action 406). At the same time the current image is rendered and displayed, the frame needed to display in the next image of the video tour is identified based on the user-specified direction of motion along the tour path (process action 408). This newly identified frame is then designated as the current frame in lieu of the previously identified frame (process action 410), and process actions 402 through 410 are repeated for as long as the user wants to view the video tour.

The input video is often traversed non-sequentially. In the case of fast motion, the stride through the input frames can be greater than one. In addition, because there are branch points along the tour path, the next frame requested can be in a totally different section of the original video. If so, there may be a mismatch in the relative rotations between the current frame and the next frame, which could cause a visible jump when that next frame is played. This mismatch can occur because the scene may have been captured while the cameraman was moving in a different direction to that which the user is now taking through the tour site. In addition, the aforementioned capture direction or global orientation may not match between these frames. The viewing and navigation module resolves the problem by automatically estimating the relative rotation between the frames using the global orientation information from the frame rotation table and correcting for it in order to minimize the visual jump that the user sees. In this way, the user can seamlessly navigate from one branch to another.

It is also noted that when the user moves through a branch point, there are two different ways the user-specified viewing direction can be handled. In tested versions of the present interactive video tour system and process, the user selects which option is to be employed via the gamepad. In one mode, called the relative mode, the viewing direction is not changed when a new path is entered. Thus, if the user had specified a particular viewing direction while on a path leading to the branch point, once the user passes the branch point and onto a new part of the tour path, this viewing direction is not changed, meaning that the portion of the frames associated with the new path that is rendered corresponds to the same angular offset from the global orientation of the frame as was used when rendering the portion of the frames played prior to moving onto the new branch path. For example, if the user specified a viewing direction just to the left of the path when approaching a branch point, he or she would still be viewing the scene just to the left of the new path once passing through the branch point.

The other mode is the absolute mode. The video data is pre-rotated such that all panoramic frames have the same orientation, for example north facing. In this case it is unnecessary to perform any rotation adjustment at a bifurcation because all frames point in the same direction.

As described previously, the viewing and navigation module also stabilizes each frame prior to rendering the desired portion of it. This is accomplished using the previously described jitter correction vector data from the frame rotation table of the scene data file, and is accomplished using conventional methods through a simple transformation of the current view matrix.

2.4.1 The Viewing and Navigation Window

Figure 5:
FIG. 5 is an image depicting one embodiment of the viewing and navigation window layout according to the present invention.

One version of the aforementioned GUI (hereinafter referred to as the viewing and navigation window) generated by the viewing and navigation module is depicted in FIG. 5. The bulk of the tour window is taken up by a frame display sector 500 in which the portion of the current frame of the tour video is displayed. In FIG. 5 the displayed scene is from a tour of a house. As discussed previously, the portion of the current frame displayed is dependent on the prescribed field of view and the viewing direction specified by the user.

Just above the frame display sector is a navigation bar 502 that generally indicates the direction to other part of the tour site. This information is displayed in the bar 502 anytime the user is approaching a branch point in the tour path. Essentially, the viewing and navigation module monitors the branch point table to determine if the user is approaching and is within a prescribed number of frames (e.g., about 40 frames) of a branch point, as indicated by its frame number in the branch point table. When it is determined that the user is approaching a branch point, the module determines the possible branch paths the user could take and identifies the name of the next region to which each of these branch paths leads. If a branch path does not leave the current region, then the name of the current region is identified for that branch path. This information comes from the map region table. These names 504 are then displayed in the navigation bar 502 with an arrow icon 506 adjacent to it that point in the general direction of the region. Notice the navigation bar 502 depicted in FIG. 5 indicates the living room is to the right and the dining room is to the left. In this way, it is easier for the user to select the desired path through the tour site at a branch point. Also note that the upcoming branch point associated with the frame depicted in FIG. 5 has two path options. Thus, it must be associated with either the previously described T or Y shaped juncture in the tour path. If the juncture was a 4-way crossing, there would be three path options listed in the navigation bar 502—namely right, left and forward paths. If the juncture is a corner, there would be just one path option shown in the navigation bar 502 in the direction of the turn in the path. Note that in any of these situations, the reverse path option would replace the forward path option if the user rotated the specified viewing direction beyond a prescribed angle (e.g., +/−90 degrees from the direction of the forward path at a branch point).

It is also noted that the navigation bar 502 depicted in FIG. 5 is just an example of how the foregoing direction aid information could be imparted to the user. For example, as an alternative, arrows (not shown) could be superimposed onto the displayed image in the directions of the path options. In addition, the name associated with each path option could be superimposed on the displayed image adjacent to the corresponding arrow.

In addition to the navigation bar 502, the example window shown in FIG. 5 also has an information bar 508. This space is generally used to provide information to the user about the current region of the tour site. In the example window shown in FIG. 5, the information bar 508 is used to display the object icons 510 described previously. Here the art case is in view and two objects in the case (i.e., the horse statue and the vase) have been set up as objects of interest. As such icons 510 representing the two objects are displayed on the bottom bar indicating to the user that additional information about these art pieces is available. Selecting one of the icons 510 via the gamepad accesses this information which is then displayed to the user in a separate window (not shown) which would be displayed over at least a portion of the viewing and navigation window. For example, selecting one of the icons 510 might pop up a high resolution still image of the corresponding art piece and an audio annotation might be played to provide information to the user about the piece. The icon details and link information needed to display the icon 510 and access the underlying link are obtained by the viewing and navigation module from the object information table described previously. Here again the display of an object information icon 510 in the information bar 508 is just an example. Other ways of imparting to the user that information is available about an object seen in the current tour location can be employed as desired. For example, it was indicated previously that an icon could be positioned on a map of the tour site and the user would select the icons from there.

The viewing and navigation window also includes a map graphic 512 as was described earlier. In the example window shown in FIG. 5, this map 512 is displayed at the bottom left hand corner. The map 512 can take any form and appearance desired. For example, the map 512 can appear semi-transparent such that the portion of the frame being displayed that lies behind the map can still be seen. In general, the map 512 provides the user with an overview of the tour site and can include indicators that show the user where he or she is currently viewing the tour site from. For example, as described previously, this can include a line representing the tour path and a marker such as an arrow that points to the current location on the path, as well as which direction the user is currently traversing the site. In addition, the map 512 can divide the site into regions, such as different rooms in a house. If so, the region where the user is currently viewing the tour site can be highlighted in any appropriate conventional manner to show the user what region he or she is currently viewing the site from. Further a label can be displayed on or adjacent to the map 512 which provides the name of the region currently being visited.

The gamepad can be used to select a different region of the tour site on the map 512 and the user is quickly transported to this new position as described earlier. The viewing and navigation module accomplishes this by first identifying the frame associated with the location on the tour path that corresponds to the point selected by the user on the map 512. As explained above this information is obtained from the path table. The portion of the frame corresponding to the user's currently specified viewing direction is rendered and displayed in the window, which appears to the user as if he or she had been transported to the new location in the tour site. In addition, the module finds the particular version of the map graphic that should be displayed when the user is viewing the site from the newly chosen region using the map region table. This new version is then displayed in the window as the map graphic 512. The same process occurs when a user moves from one region to the other using the gamepad motion commands, rather than selecting a new location on the map 512.

The previously described object replacement feature, when included, generally allows the user to select from a displayed list of replacement items. The selected item, which could be things such as graphics, images, videos or video-textures, are superimposed by the viewing and navigation module on a prescribed area within a currently displayed portion of a frame. Alternately, the user repeatedly inputs a change command which causes a different one of the available items for object of interest to be superimposed thereon with each selection event so as to cycle through the choices until the user find the one desired.

Figure 6:
FIG. 6 is an image showing a portion of a current frame of an interactive video tour of a house that includes a replaceable object in the form of a television.

The viewing and navigation module accomplishes the object replacement feature by monitoring the object replacement information table and whenever the frame that is about to be rendered falls within a range specified in the table, the module obtains the location information from the table that specifies where the area associated with the replacement object is located within the frame and optionally highlights that area via any appropriate method. This highlighting alerts the user that the object represents a replacement object. The module also either renders and displays the menu identified in the table for that frame range in the viewing and navigation window, or renders and displays a pre-designated first one of the replacement items identified in the table over the previously identified area associated with the replacement object. Even if the menu is displayed, the module can also render and display a pre-selected one of the items associated with the replacement object over the aforementioned area in the displayed portion of the current frame. When the user selects an item from the menu that is not currently displayed, or inputs a change command, the viewing and navigation module renders the new item and displays it in the identified area in lieu of what was previously displayed in that area. The rendering and superimposing functions are performed using any appropriate conventional method. An example of this feature is shown in FIG. 6, which represent a portion of a displayed frame of an interactive video tour of a house that includes a replaceable object in the form of a television 600. In this case, the provided replacement items represent different videos or even live broadcasts that could be played and superimposed on the screen 602 of the television 600 while the user is viewing the portion the scene containing the television.

In addition to identifying where an object is visible in each effected frame, an associated occlusion mask is also provided for each frame. The occlusion mask specifies the visibility for each pixel of the replaceable object. This is similar to convential "blue-screening" techniques. In fact, in a tour it will often happen that objects closer to the observer will occlude (partially or totally) the selected object (e.g. a chair in front of the TV set). At viewing time the selected object is replaced by the replacement object, but each pixel is only as visible as indicated by the related occlusion mask. The occlusion masks are stored contiguous with the video data as 8 bit images, where 0 specifies a totally occluded pixel, 255 specifies a totally visible pixel and values in between are for partially occluded pixels. The position (e.g., corners) of the occlusion mask relative to the current frame is stored in the object replacement table. This allows the system to align the occlusion map with the frame being rendered and thus deal with occlusion events correctly and further enhancing the sense of realism.

3.0 References

[1] Aliaga, D., et al. 1999. MMR: An interactive massive model rendering system using geometric and image based acceleration. In *Proc. of the* 1999 *symp. on Interactive 3D graphics*, ACM Press, 199–206.

[2] Antone, M., and Teller, S. 2002. Scalable extrinsic calibration of omnidirectional image networks. *Int'l J. of Computer Vision* 49, 2/3 (March), 143–174.

[3] Boult, T. E. 1998. Remote reality via omnidirectional imaging. In *SIGGRAPH* 1998 *Technical Sketch*, 253. Brooks, F. P. 1986. Walkthrough a dynamic graphics system for simulating virtual buildings. In *Workshop on Interactive 3D Graphics*, 9–21.

[4] Chen, S. E. 1995. QuickTime VR—an image based approach to virtual environment navigation. *Computer Graphics* (*SIGGRAPH'95*) (August), 29–38.

[5] Debevec, P. E., Taylor, C. J., and Malik, J. 1996. Modeling and rendering architecture from photographs: A hybrid geometry and image based approach. *Computer Graphics* (*SIGGRAPH'96*) (August), 11–20.

[6] Koch, R., Pollefeys, M., and Van Gool, L. 2000. Realistic surface reconstruction of 3d scenes from uncalibrated image sequences. *J. Visualization and Computer Animation* 11, 115–127.

[7] Lippman, A. 1980. Movie maps: An application of the optical videodisc to computer graphics. *Computer Graphics* (*SIGGRAPH'80*) 14, 3 (July), 32–43.

[8] Taylor, C. J. 2000. Videoplus: A method for capturing the structure and appearance of immersive environments photographs. In *European Workshop on 3D Structure from Multiple Images of Large-Scale Environments* (*SMILE* 2000), M. Pollefeys et al., Eds., 187–204.

[9] Teller, S. J., and S' equin, C. H. 1991. Visibility preprocessing for interactive walkthroughs. In *Computer Graphics* (*Proc. of SIGGRAPH* 91), vol. 25, 61–69.

Wherefore, what is claimed is:

1. In a computer system having a user interface comprising a display and user interface selection device, a process for presenting an interactive video tour of a tour site, comprising process actions for:

inputting data associated with the video tour, said inputting comprising,
  inputting video data comprising a sequence of video frames each of which represents a panoramic view of the tour site from a particular location along said path, and
  inputting scene data, which given a viewing direction and optionally a user-specified direction of motion along the tour path, is used to determine which video frame and what part of that video frame is needed to render and display the next image of the video tour;
displaying a viewing and navigation window on the display, wherein the window comprises a plurality of sectors for viewing and controlling the video tour; and
implementing commands entered by a user directly via said selection device and via the user selecting displayed items within the viewing and navigation window sectors using said selection device, so as to give the user continuous control over both the viewing position along a path through the tour site and viewing direction at points on the path.

2. The process of claim 1, wherein the path through the tour site has at least one branch point from each of which the path either turns an abrupt corner or diverges in more than one direction thereby allowing the user to follow any part of the path extending away from the branch, and wherein the process action of inputting scene data comprises an action of inputting a branch points table which for each video frame associated with a branch point identifies the next video frame that is to be played in view of the current user-specified viewing direction.

3. The process of claim 2, wherein the action of inputting a branch points table which for each video frame associated with a branch point identifies the next video frame that is to be played in view of the current user-specified viewing direction, comprises an action of defining a range of viewing directions for each part of the path diverging from each branch point such that when a user specifies a viewing direction within the defined range for a part of the path extending away from a viewing location that is a branch point, the frame associated with the first specifiable location along that part of the path from the branch point is identified as the next video frame that is to be played.

4. The process of claim 2, wherein the branch points comprise at least one (i) a point where the path turns a corner, (ii) a point where the path crosses itself to form a four or more-way intersection, (iii) a point where the path forms an approximately T-shaped three-way intersection, and (iv) a point where the path forms an approximately Y-shaped three-way intersection.

5. The process of claim 1, wherein the plurality of viewing and navigation window sectors comprises a sector for displaying a portion of the frame associated with a current viewing position which corresponds to a prescribed field of view around a current viewing direction, and wherein the process action of inputting scene data comprises an action of inputting a frame rotation table which for each video frame identifies a global orientation direction corresponding to a direction designated when the frame was captured as a zero degree line from which the user-specified viewing direction is measured thereby facilitating finding the portion of the frame to be displayed.

6. The process of claim 5, wherein the plurality of viewing and navigation window sectors comprises a sector for displaying an icon representing an object of interest residing in the tour site which when selected by the user causes additional information about the object to be displayed, and wherein the process action of inputting scene data comprises an action of inputting an object information table that for a prescribed set of frame ranges and viewing directions associated with the frames of those frame ranges in which the object of interest appears, identifies the particular icon that is to be displayed and link details needed to access said information about the object.

7. The process of claim 5, wherein the process action of displaying a portion of the frame associated with the current viewing position which corresponds to a prescribed field of view around the current viewing direction plurality comprises displaying a replaceable object within the displayed frame portion, and wherein the process action of inputting scene data comprises an action of inputting an object replacement information table that for a prescribed set of frame ranges and viewing directions associated with the frames of those frame ranges in which the replaceable object appears, identifies a menu that is to be displayed in the viewing and navigation window comprising a list of replacement objects and link details for each replacement object listed that are needed to access said replacement objects which are to be displayed in place of the replaceable object upon selection of that replacement object from the menu by the user.

8. The process of claim 5, wherein the process action of displaying a portion of the frame associated with the current viewing position which corresponds to a prescribed field of view around the current viewing direction plurality comprises displaying a replaceable object within the displayed frame portion, and wherein the process action of inputting scene data comprises an action of inputting an object replacement information table that for a prescribed set of frame ranges and viewing directions associated with the frames of those frame ranges in which the replaceable object appears, identifies link details for a group of replacement objects that are needed to access each of said objects, which are displayed one at a time in place of the replaceable object in a prescribed cyclical order upon entry of a change command by the user.

9. The process of claim 1, wherein the method employed to capture the video frames introduced jitter, and wherein the process action of inputting scene data comprises an action of inputting a frame rotation table which for each video frame identifies a jitter correction factor thereby allowing the jitter to be removed from each frame prior to a portion thereof being rendered and displayed.

10. The process of claim 1, wherein the plurality of viewing and navigation window sectors comprises a sector for displaying a map graphic of the tour site, and wherein the process action of inputting scene data comprises an action of inputting a map region table which for each of a prescribed set of frame ranges identifies the particular map graphic that is to be displayed whenever a portion of a video frame within that frame range is rendered and displayed.

11. The process of claim 1, wherein the plurality of viewing and navigation window sectors comprises a sector for displaying a name associated with a region of the tour site that the user is currently viewing, and wherein the process action of inputting scene data comprises an action of inputting a map region table that for each of a prescribed set of frame ranges, each of which is associated with a particular region of the tour site, identifies the name associated with that region.

12. The process of claim 1, wherein the plurality of viewing and navigation window sectors comprises a sector for displaying a map graphic of the tour site that comprises a line representing the tour path and an indicator which identifies the point on the tour path from which the user is currently viewing the tour site, and wherein the process action of inputting scene data comprises an action of inputting a path table which for each video frame identifies a location on the map graphic representing the point on the tour path that the frame was captured thereby facilitating the placement of said indicator on the map graphic.

13. The process of claim 1, wherein the plurality of viewing and navigation window sectors comprises a sector for displaying a map graphic of the tour site that comprises a line representing the tour path, and wherein the process action of inputting scene data comprises an action of inputting a path table which for each video frame identifies a location on the map graphic representing the point on the tour path that the frame was captured, and wherein whenever the user selects a point on the tour path line of the map graphic, the next frame from which a portion is rendered and displayed is the frame identified in the path table as corresponding to the user-selected path point, thereby allowing the user to view another part of the tour site without having to follow the tour path to that part.

14. A computer-implemented process for providing an interactive video tour of a tour site to a user, comprising using a computer to perform the following process actions:
  (a) inputting video data comprising a sequence of video frames each of which represents a panoramic view of the tour site from a particular location along a path through the tour site;
  (b) inputting scene data which comprises information to identify the frame associated with each specifiable location along the path, and that given a viewing direction and a user-specified direction of motion along the tour path, is used to determine which video frame and what part of that video frame is needed to render and display the next image of the video tour;
  (c) for a given viewing position within the site along the path, identifying the frame associated with that position using the scene data and designating it as the current frame;
  (d) inputting a current user-specified viewing direction, and a current user-specified direction of motion along the tour path, if one;
  (e) obtaining from the video data that portion of the current frame which corresponds to a prescribed field of view around the current viewing direction;
  (f) rendering the obtained portion of the current frame and displaying it to the user, while simultaneously identifying the frame needed to display the next image of the video tour in view of the user-specified direction of motion along the tour path using the scene data;
  (g) designating the newly identified frame as the current frame in lieu of the previously identified frame;
  (h) repeating process action (d) through (g) for as long as the user wants to view the video tour.

15. The process of claim 14, wherein the video data is compressed using a compression method which allows the decompression of any frame, not just the next sequential frame, and which allows any portion of a frame to be decompressed without having to decompress the rest of the frame, and wherein the process action of obtaining from the video data that portion of the current frame which corresponds to the prescribed field of view around the current viewing direction, comprises an action of exclusively decompressing just said portion of the current frame.

16. The process of claim 14, wherein the scene data comprises a global orientation direction for each video frame which corresponds to a direction designated when the frame was captured as a zero degree line from which the viewing direction is measured, and wherein the process action of obtaining from the video data that portion of the current frame which corresponds to the prescribed field of view around the current viewing direction, comprises an action of identifying said portion of the current frame which corresponds to the prescribed field of view around the current viewing direction by measuring the viewing direction from the global orientation direction.

17. The process of claim 16, wherein the method employed to capture the video frames introduced jitter, and wherein the scene data comprises a jitter correction factor for each video frame, and wherein the process action of obtaining from the video data that portion of the current frame which corresponds to the prescribed field of view around the current viewing direction, comprises the actions of:
  obtaining the jitter correction factor associated with the current frame from the scene data; and
  employing said jitter correction factor to remove the jitter from said portion of the current frame.

18. The process of claim 14, wherein the process action of identifying the frame needed to display the next image of the video tour in view of the user-specified direction of motion, comprises an action of designating the previously designated frame as the newly designated frame whenever no direction of motion is specified.

19. The process of claim 14, wherein the path through the tour site has at least one branch point from each of which the path either turns an abrupt corner or diverges in more than one direction such that the user can follow any part of the path extending away from the branch, and wherein the scene data comprises a branch points table which for each video frame associated with a branch point identifies the next video frame that is to be played in view of the current viewing direction, and wherein the process action of identifying the frame needed to display the next image of the video tour in view of the user-specified direction of motion, comprises the actions of:
  determining from the scene data whether the current frame is associated with a branch point; and
  whenever the current frame is not associated with a branch point,
    identifying the next sequential frame of the video data as the newly identified frame if the user has specified a forward motion direction as related to what was the forward direction when the video frames were captured, and
    identifying the previous sequential frame of the video data as the newly identified frame if the user has specified a backwards motion direction as related to what was the forward direction when the video frames were captured.

20. The process of claim 19, further comprising an action of determining if the current viewing direction is outside a prescribed forward range, and whenever it is determine the current viewing direction is outside the forward range and a forward direction of motion is specified by the user, the motion command is ignored and rather than identifying the next sequential frame of the video data as the newly identified frame, the previously identified frame is designated as the newly identified frame such that the user continues to view the tour site from the same location.

21. The process of claim 19, further comprising an action of determining if the current viewing direction is outside a prescribed backward range, and whenever it is determine the current viewing direction is outside the backward range and a backward direction of motion is specified by the user, the motion command is ignored and rather than identifying the previous sequential frame of the video data as the newly identified frame, the previously identified frame is designated as the newly identified frame such that the user continues to view the tour site from the same location.

22. The process of claim 16, wherein the path through the tour site has at least one branch point from each of which the path either turn an abrupt corner or diverges in more than one direction such that the user can follow any part of the path extending away from the branch, and wherein the scene data comprises a branch points table which for each video frame associated with a branch point identifies the next video frame that is to be played in view of the current viewing direction, and wherein the process action of identifying the frame needed to display the next image of the video tour in view of the user-specified direction of motion, comprises the actions of:
   determining from the scene data whether the current frame is associated with a branch point; and
   whenever the current frame is associated with a branch point, identifying the frame of the video data specified in the scene data as the next frame for the current viewing direction as the newly identified frame.

23. The process of claim 22, wherein a substantial divergence in the global orientation direction may exist between a frame associated with a branch point and the frame designated as the newly identified frame, and wherein process action of obtaining from the video data that portion of the current frame which corresponds to the prescribed field of view around the current viewing direction comprises the actions of:
   estimating the relative rotation between the frames using the global orientation information for those frames from the scene data; and
   correcting for any mismatch in order to minimize a visual jump that the user can see when the tour image associated with the frame portion is displayed.

24. The process of claim 22, wherein the video data is pre-rotated such that all panoramic frames have the same orientation, and wherein process action of obtaining from the video data that portion of the current frame which corresponds to the prescribed field of view around the current viewing direction does not require any rotation adjustment.

25. The process of claim 14, wherein the user is allowed to input a new path location at any time during the progress of the interactive video tour, and wherein the process further comprises an action of restarting at process action (c) whenever the user inputs a new path location.

26. A system for providing an interactive video tour of a tour site to a user, comprising:
   a general purpose computing device comprising a display and a user selection device; and
   a computer program comprising program modules executable by the computing device, wherein the computing device is directed by the program modules of the computer program to,
      input video data comprising a sequence of video frames each of which represents a panoramic view of the tour site from a particular location along a path through the tour site,
      input scene data comprising information to identify the frame associated with each specifiable location along the path, and that given a viewing direction and a user-specified direction of motion along the tour path, is used to determine which video frame and what part of that video frame is needed to render and display the next image of the video tour,
      display a viewing and navigation window on the display, wherein the window comprises a plurality of sectors for viewing and controlling the video tour, and
      implementing commands comprising a current user-specified viewing direction and a current user-specified direction of motion along the tour path, if one, which are entered by a user directly via said selection device and via the user selecting displayed items within the viewing and navigation window sectors using said selection device, so as to give the user continuous control over both the viewing position along a path through the tour site and viewing direction at points on the path.

27. The system of claim 26, wherein the program module for displaying the viewing and navigation window comprises a sub-module for displaying a frame display sector that presents a portion of the frame associated with a current viewing position in the tour site, wherein said frame portion corresponds to a prescribed field of view around the current viewing direction.

28. The system of claim 27, wherein the program module for displaying the viewing and navigation window comprises a sub-module for displaying direction indicators on the portion of the frame associated with a current viewing position in the tour site displayed in the display sector, wherein the direction indicators point to the direction to regions of the tour site which are adjacent to the region currently being viewed by the user.

29. The system of claim 27, wherein the program module for displaying the viewing and navigation window comprises sub-modules for:
   displaying a replaceable object within the portion of the frame displayed in the display sector;
   upon selection of the replaceable object by the user, displaying a menu in the viewing and navigation window comprising a list of replacement objects; and
   upon selection of a replacement object from said list by the user, displaying that replacement object within the portion of the frame associated with the replaceable object.

30. The system of claim 29, wherein the sub-modules for displaying the replaceable object within the portion of the frame displayed in the display sector and displaying a replacement object within the portion of the frame associated with the replaceable object, each comprises sub-modules for:
   obtaining an occlusion mask associated with the frame, wherein the occlusion mask specifies the degree of visibility for each pixel of the replaceable or replacement object in a range from completely occluded through partially visible to totally visible;
   displaying each pixel of the replaceable object or replacement object with the visibility indicated for that pixel in the occlusion map.

31. The system of claim 30, wherein the sub-module for displaying each pixel of the replaceable object or replacement object with the visibility indicated for that pixel in the occlusion map, comprises a sub-module for obtaining alignment information associated with the occlusion map which specifies the position of the map relative to the frame so that the pixels of the frame subject to the visibility indicators of the occlusion map can be identified.

32. The system of claim 27, wherein the program module for displaying the viewing and navigation window comprises sub-modules for:
displaying a replaceable object within the portion of the frame displayed in the display sector; and
displaying a replacement object within the portion of the frame associated with the replaceable object in lieu thereof, each time the user selects the replaceable or replacement object, wherein the replacement objects are displayed in a prescribed order and are displayed cyclically.

33. The system of claim 32, wherein the sub-modules for displaying the replaceable object within the portion of the frame displayed in the display sector and displaying a replacement object within the portion of the frame associated with the replaceable object, each comprises sub-modules for:
obtaining an occlusion mask associated with the frame, wherein the occlusion mask specifies the degree of visibility for each pixel of the replaceable or replacement object in a range from completely occluded through partially visible to totally visible;
displaying each pixel of the replaceable object or replacement object with the visibility indicated for that pixel in the occlusion map.

34. The system of claim 33, wherein the sub-module for displaying each pixel of the replaceable object or replacement object with the visibility indicated for that pixel in the occlusion map, comprises a sub-module for obtaining alignment information associated with the occlusion map which specifies the position of the map relative to the frame so that the pixels of the frame subject to the visibility indicators of the occlusion map can be identified.

35. The system of claim 26, wherein the program module for displaying the viewing and navigation window comprises a sub-module for displaying a navigation sector that indicates the name and direction to regions of the tour site which are adjacent to the region currently being viewed by the user in the frame display sector.

36. The system of claim 26, wherein the program module for displaying the viewing and navigation window comprises a sub-module for displaying a information sector that comprises one or more icons representing an object of interest which is visible in the portion of the frame associated with a current viewing position that is displayed in the display sector, and wherein, whenever the user selects one of said icons, additional information about the associated object is displayed in a separate window on the display.

37. The system of claim 26, wherein the program module for displaying the viewing and navigation window comprises a sub-module for displaying a map sector which comprises a map graphic of the tour site.

38. The system of claim 37, wherein the sub-module for displaying the map sector further comprises displaying a line representing the tour path on the map graphic.

39. The system of claim 38, wherein the sub-module for displaying the map sector further comprises displaying an indicator which identifies the point on the tour path from which the user is currently viewing the tour site.

40. The system of claim 38, wherein the program module for displaying the viewing and navigation window comprises a sub-module for displaying a frame display sector that presents a portion of the frame associated with a current viewing position in the tour site which corresponds to a prescribed field of view around the current viewing direction, and wherein whenever the user selects a point on the tour path line of the map graphic, the next frame from which a portion is displayed in the frame display sector is the frame corresponding to the user-selected path point, thereby allowing the user to view another part of the tour site without having to follow the tour path to that part.

41. The system of claim 37, wherein the sub-module for displaying the map sector further comprises displaying a name given to the region currently being viewed by the user on the map graphic.

42. The system of claim 26, wherein said user selection device allows the user to pan the viewing direction left/right/up/down and select the direction of motion to move the user's viewing position forwards and backwards along the tour path.

43. The system of claim 42, wherein the user selection device is a gamepad.

44. A computer-readable medium having computer-executable instructions for providing an interactive video tour of a tour site to a user, said computer-executable instructions comprising:
(a) inputting video data comprising a sequence of video frames each of which represents a panoramic view of the tour site from a particular location along a path through the tour site;
(b) inputting audio data which represents sounds associated with the tour site;
(c) inputting scene data which comprises information to identify the frame associated with each specifiable location along the path, and that given a viewing direction and a user-specified direction of motion along the tour path, is used to determine which video frame and what part of that video frame is needed to render and display the next image of the video tour;
(d) for a given viewing position within the site along the path, identifying the frame associated with that position using the scene data and designating it as the current frame;
(e) inputting a current user-specified viewing direction, and a current user-specified direction of motion along the tour path, if one;
(f) obtaining from the video data that portion of the current frame which corresponds to a prescribed field of view around the current viewing direction;
(g) rendering the obtained portion of the current frame and displaying it to the user, while simultaneously identifying the frame needed to display the next image of the video tour in view of the user-specified direction of motion along the tour path using the scene data;
(h) designating the newly identified frame as the current frame in lieu of the previously identified frame;
(i) repeating process action (e) through (h) for as long as the user wants to view the video tour.

45. The computer-readable medium of claim 44, wherein the instruction for inputting audio data, comprises sub-instructions for:
inputting a plurality of audio tracks, each of which was captured at a different known location within the tour site;
attenuating each track based on the inverse square distance rule in view of the user's current viewing location in the tour site;
mixing the attenuated tracks together; and
playing the mixed audio tracks to the user for as long as the user remains at the current viewing location.

* * * * *